Figure 1:
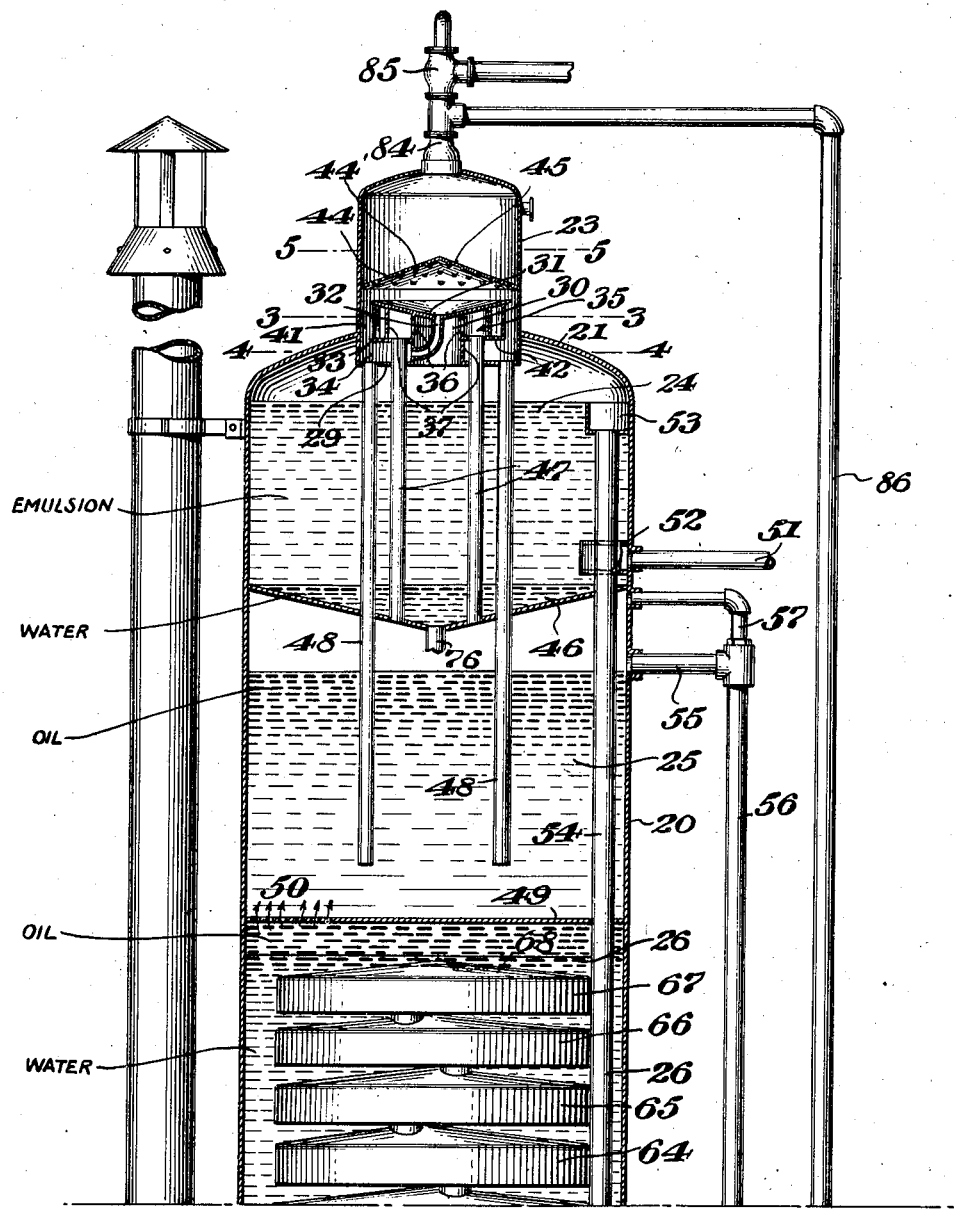

May 3, 1949.   A. V. B. CANDLER   2,468,958
APPARATUS FOR TREATING CRUDE OIL VAPORS
Filed July 19, 1945   5 Sheets-Sheet 1

Inventor,
A. V. B. Candler.
By [signature] atty.

Fig. 1ᵃ

Inventor.
a. V. B. Candler

May 3, 1949.  A. V. B. CANDLER  2,468,958
APPARATUS FOR TREATING CRUDE OIL VAPORS
Filed July 19, 1945  5 Sheets-Sheet 3

Inventor,
a.V.B.Candler.
By
atty.

May 3, 1949.　　　　A. V. B. CANDLER　　　　2,468,958
APPARATUS FOR TREATING CRUDE OIL VAPORS
Filed July 19, 1945　　　　　　　　　　　　　5 Sheets-Sheet 4
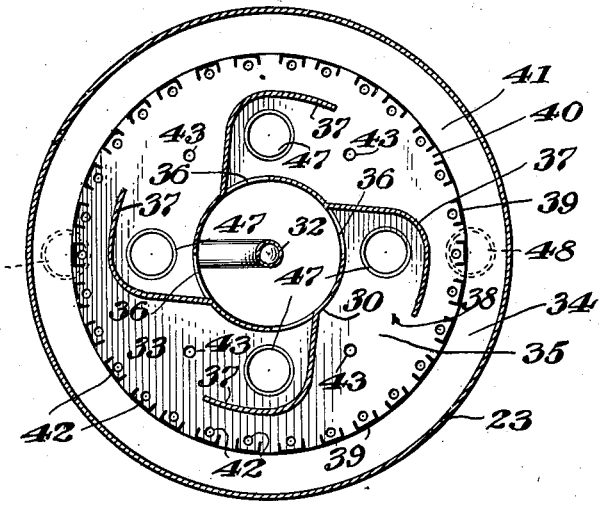
Fig. 3.
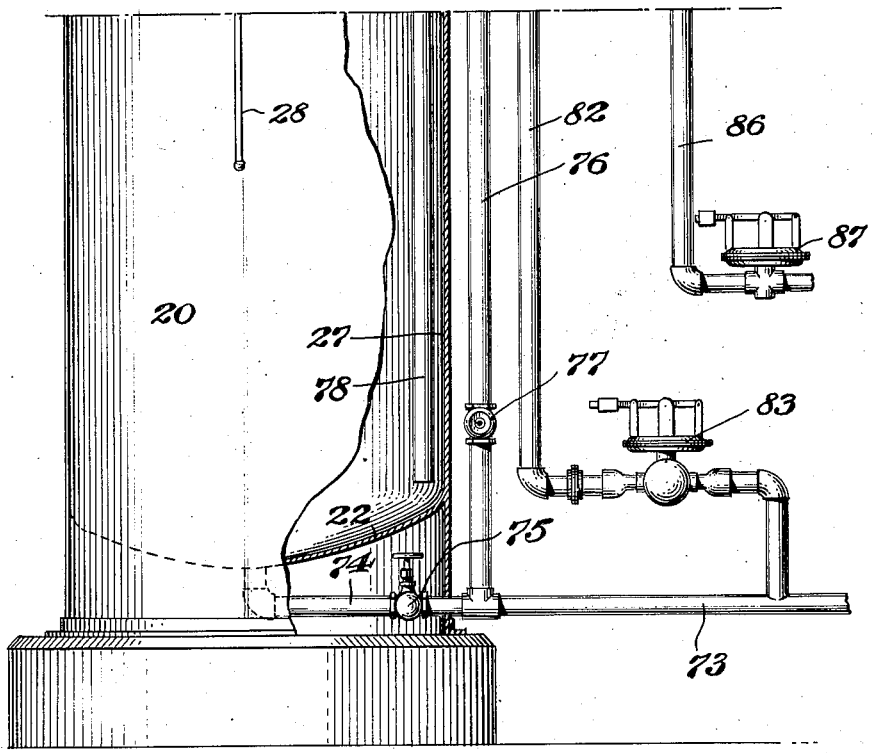
Fig. 2ᵃ
Inventor,
A. V. B. Candler,
By　　　　　atty.

Figures 6, 7, 8:
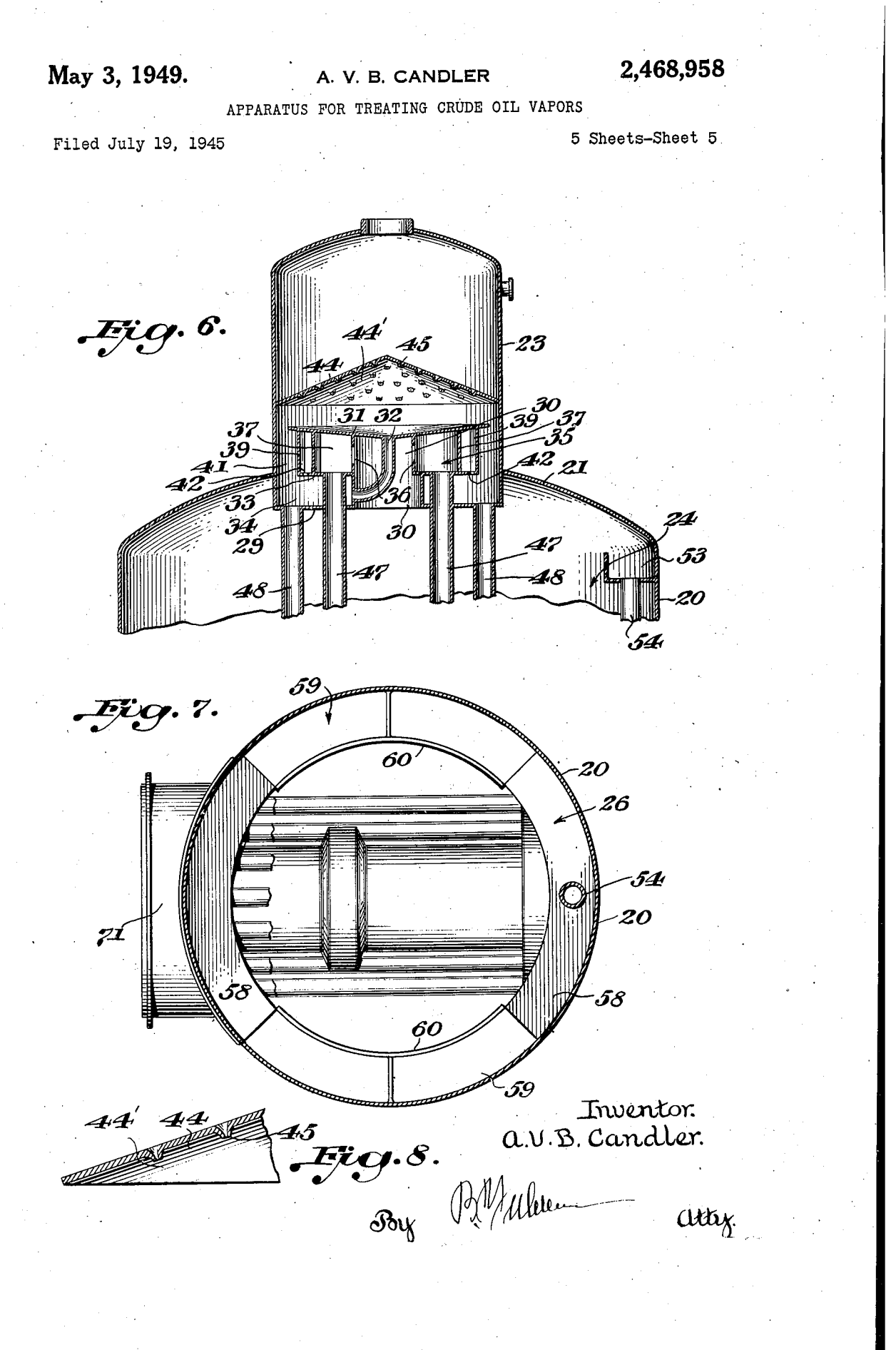

May 3, 1949.　　　A. V. B. CANDLER　　　2,468,958
APPARATUS FOR TREATING CRUDE OIL VAPORS
Filed July 19, 1945　　　　　　　　　　　　　5 Sheets-Sheet 5

Inventor.
A. V. B. Candler.
By
Atty.

Patented May 3, 1949

2,468,958

UNITED STATES PATENT OFFICE 2,468,958

APPARATUS FOR TREATING CRUDE OIL VAPORS

Arthur V. B. Candler, Tulsa, Okla., assignor to Maloney-Crawford Tank & Manufacturing Co., Tulsa, Okla., a corporation of Delaware Application July 19, 1945, Serial No. 605,949

3 Claims. (Cl. 183—94)

My invention relates to apparatus for treating crude oil containing an emulsion, to break the emulsion and free the oil, and also for separating out the free water and gas in the mixture.

Important objects of the invention are to modify or change the apparatus shown in my co-pending application for Method of and apparatus for treating crude oil, filed December 1, 1944, Serial Number 569,190, and to provide an apparatus for meeting different conditions of service; to provide means for effectively dehydrating without evaporation losses where the crude emulsion contains only small volumes of free water and small volumes of gas, or where the free water has been removed prior to delivery of the crude emulsion to such apparatus; to provide apparatus of the above mentioned character for effectively dehydrating crude oil emulsions in which the gas liberated during the process is comparatively low in volume and also the free water is comparatively low in volume, while accomplishing the separation and maintaining the gravity and volume content of the oil contained in the emulsion; to provide apparatus of the above mentioned character, which is continuous and efficient in operation; which has been found to break tight petroleum emulsions without the aid of interposed filters; which will first separate the free water and gas from the emulsion and then treat the emulsion in order to lower the interfacial tension between the oil and water constituting the liquid and to remove solid particles, such as mineral salts, therefrom; which will subject the oil vapors to a treatment for separating the dry gas and liquid content from such vapors; which will produce a lowered temperature in the gas separating means to facilitate the separation of the liquid content; which will cause the emulsion to be continuously circulated in a body of water while being subjected to the action of heat and a retarding and rubbing action for breaking the tight emulsion; which will maintain substantially constant the level of the liquids being treated; and which has its several parts correlated for employing the action of heat, gravity, centrifugal force, gas expansion, condensation, reduction of velocity and surface contact, in its operation.

Other objects and advantages of the invention will be apparent during the course of the following description.

Figure 2:
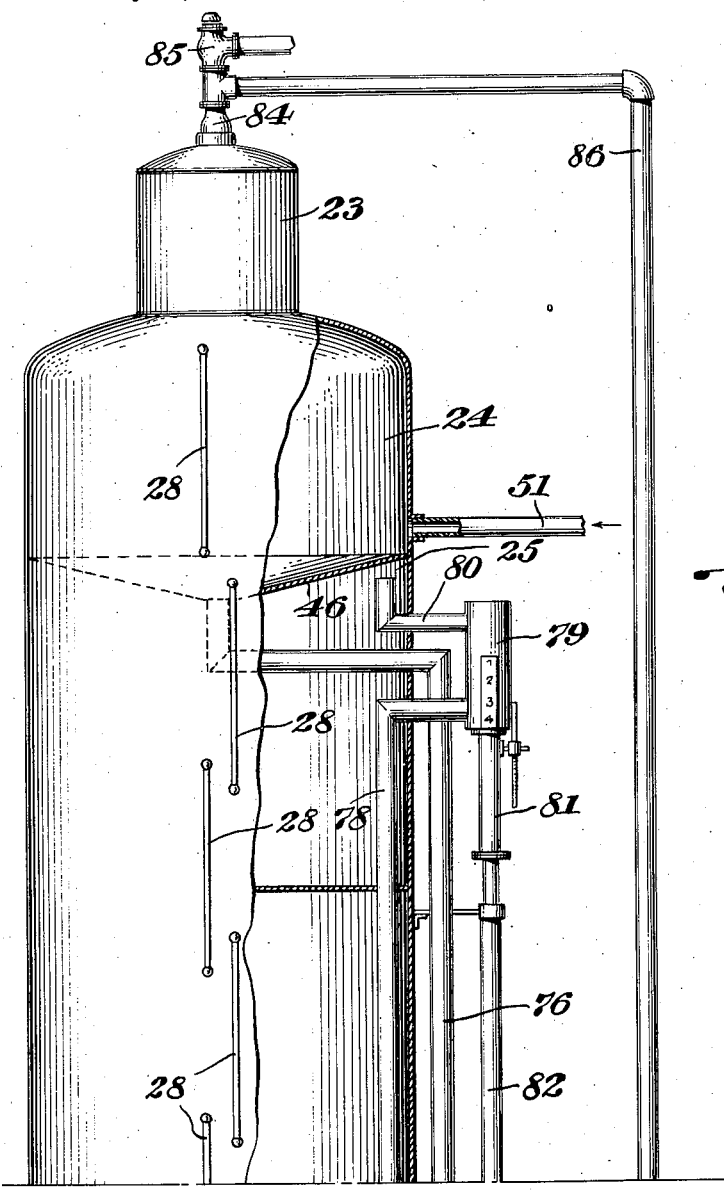
Figure 4:
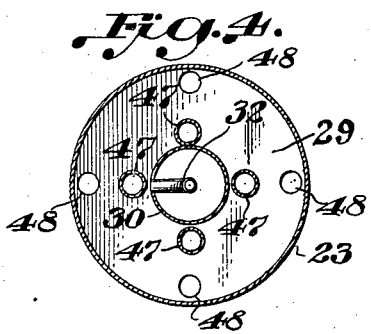
Figure 5:
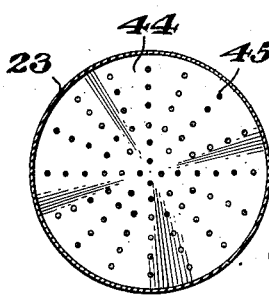

In the accompanying drawings forming a part of this application, and in which like numerals are employed to designate like parts throughout the same, Figure 1 is a central vertical section through the upper portion of the apparatus embodying my invention, Figure 1ª is a similar view through the lower portion of the apparatus, Figure 2 is a side elevation, parts in section, of the upper portion of the apparatus, Figure 2ª is a similar view of the lower portion of the apparatus, Figure 3 is a horizontal section taken on line 3—3 of Figure 1, the main casing being omitted Figure 4 is a horizontal section taken on line 4—4 of Figure 1, Figure 5 is a horizontal section taken on line 5—5 of Figure 1, Figure 6 is an enlarged central vertical section through the gas separating chamber and associated elements, Figure 7 is a horizontal section taken on line 7—7 of Figure 1ª.

Figure 9:
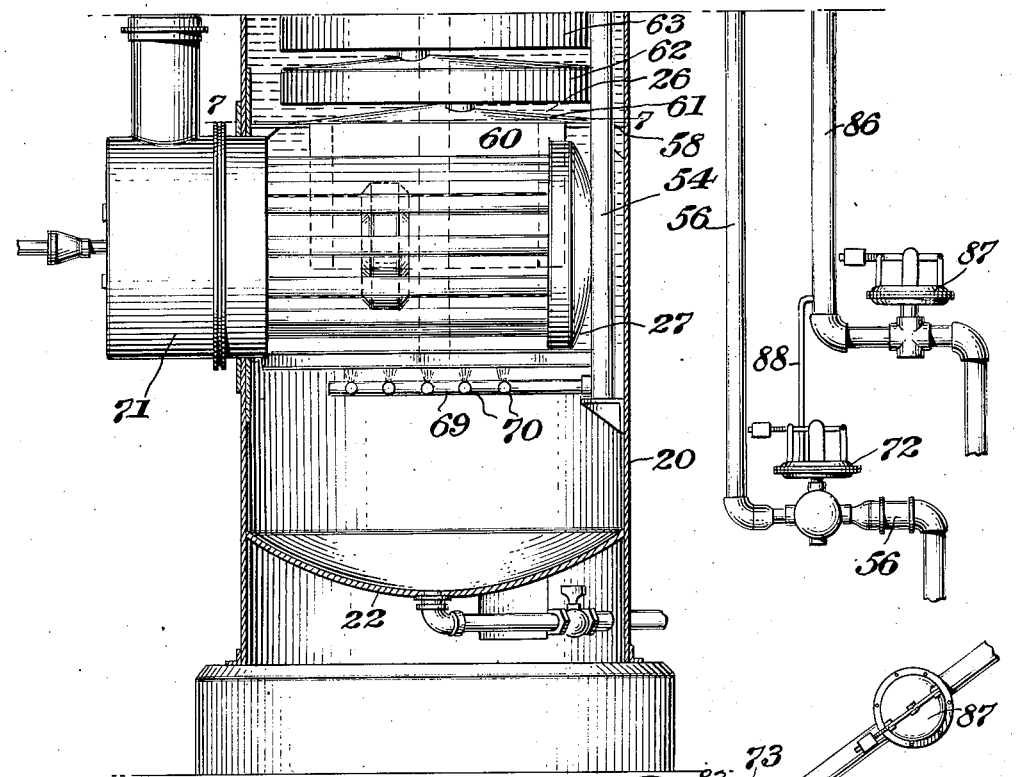
Figure 9:
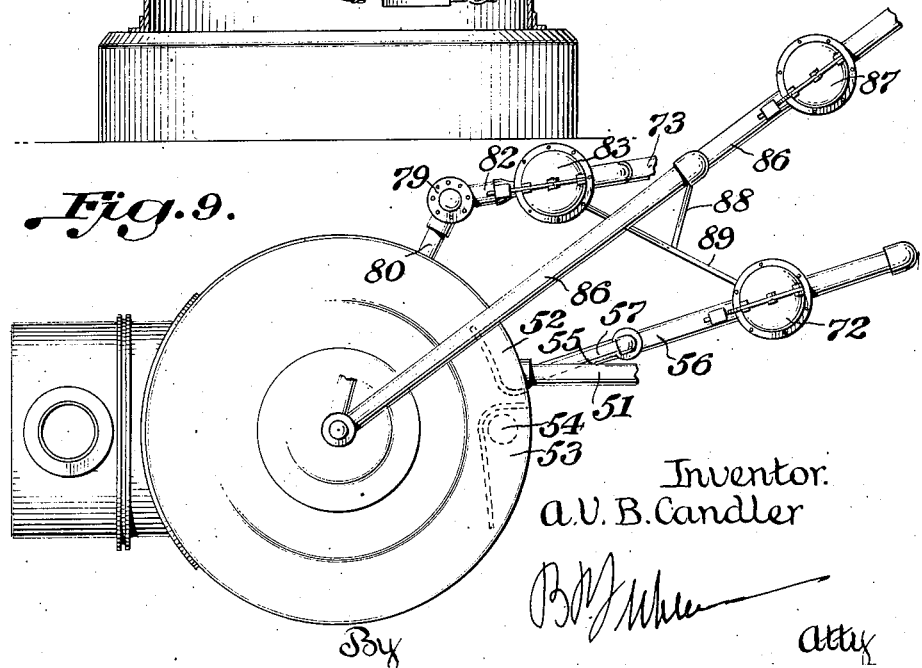

Figure 8 is an enlarged fragmentary section through the perforated cone or tapered plate, Figure 9 is a plan view of the apparatus.

In the drawings, wherein for the purpose of illustration is shown a preferred embodiment of my invention, the numeral 20 designates a vertical casing or tank, which is preferably cylindrical and closed at its top and bottom by heads 21 and 22.

The apparatus comprises a gas separating chamber or turret 23, and means are provided for forming within the tank 20 a receiving chamber 24, a settling chamber 25, a scrubbing and treating chamber 26, and a heating and bottom accumulator chamber 27. These various chambers are arranged in end-to-end superposed relation, as shown. The casing 20 is provided with tube gauges 28, indicating the level of the liquids in the several chambers.

The gas separating chamber or turret 23 has its lower end mounted upon the top of the receiving chamber 24, and extends below this top for a short distance. The chamber or turret 23 is provided with an annular imperforate bottom 29, Figures 4 and 6. Connected with the annular bottom 29 at its center is a large vertical tube or cylinder 30, the lower end of which is open, and in free communication with the receiving chamber 24. Arranged above the top of the central tube of cylinder 30 is an imperforate plate 31, attached to the tube 30 and forming a gas-tight joint therewith. The plate 31 is circular and is arranged in spaced concentric relation to the side of the chamber or turret 23, as shown. The plate 31 is conical and tapers downwardly and has a pipe 32 connected therewith at its center or bottom, and this pipe 32 is connected with the side of the tube 30, near its bottom, as shown. An annular plate 33 is arranged horizontally beneath the plate 31 in spaced relation thereto, and the annular plate 33 is connected with the tube 30 and forms a gas-tight joint therewith. The annular plate 33 is arranged in spaced concentric relation to the side of the chamber or turret 23, as shown. The annular bottom 29 and plate 33 form an annular sump chamber 34, and the lower end of the pipe 32 discharges into this sump chamber, at its inner periphery. The separated oil collected upon the top of the plate 31 will gravitate through the pipe 32 and be conducted into the sump chamber 34. The plate 31 forms with the plate 33 an annular gas receiving space or chamber 35. The central tube 30 is provided with openings 36, covered by wings or vanes 37, attached to the tube 30 and to the plates 31 and 33. The outer portions of these wings or vanes are bent or face circumferentially, affording discharge openings 38, and these wings or vanes are adapted to impart a circumferential movement to the gases passing through and from the openings 36. Arranged between the plates 31 and 33 is a barrier or obstructing unit including an annular set of vertical channels 39, which face inwardly, and are attached to the plates 31 and 33 at their peripheries. These channels are spaced, providing passages 40, Figure 3, in communication with the space or chamber 35, and an annular vertical passage 41, Figures 1 and 6, which leads into the sump chamber 34. The plate 33 is provided with an annular set of apertures 42, leading into the passages of the channels, as shown. The plate 33 has additional apertures 43. Apertures 42 and 43 are in communication with the sump chamber 34. Arranged within the chamber or turret 23 above and spaced from the plate 31 is a conical or upwardly tapering plate 44, extending to the side of the turret 23 and attached thereto. This conical or tapered plate 44 is perforated, as shown at 45. These perforations 45 are punched and swaged inwardly or downwardly, as shown in Figure 8. The plate 44 forms with the plate 31 a chamber 44' receiving the relatively cool dry gas from the gas separating section. It is pointed out that the temperature of the vapors released from the hot oil in the settling chamber 25 upon passing upwardly through the pipes 47, which are immersed in the relatively cool incoming emulsion in receiving chamber 24, is progressively reduced due to the heat transfer between the warm vapors arising through pipes 47 and the cool emulsion. This promotes separation of the heavier hydrocarbons by condensation in addition to the mechanical action of the gas separator. In the present apparatus, the gas separating chamber or turret 23 is in effect a separate unit, providing means for reclaiming the liquid and draining it directly into the settling chamber, which means is not in the receiving chamber.

The receiving chamber 24 has a bottom 46 which is conical or tapers downwardly. Vertical pipes 47 pass through the annular bottom 29 and through the plate 33 and lead into the chamber 35, at their upper ends, and discharge into the chamber 35, within the wings or vanes 37. The pipes 47 correspond in number to the wings or vanes 37. The lower ends of the pipes 47 pass through the bottom 46 and lead into the top of the settling chamber 25. Each pipe 47 has its opposite ends open. Vertical down-pipes 48 have their upper ends leading into the sump chamber 34. These down-pipes 48 pass through the bottom 46 and discharge into the settling chamber 25, near its bottom. Two pipes 47 are shown for the purpose of illustration. The settling chamber 25 has a horizontal bottom 49, provided with a group of apertures 50, as shown.

The emulsion is supplied to the receiving chamber 24 through a pipe 51, leading into the receiving chamber near its bottom and well below the level of the raw emulsion therein. The pipe 51 discharges into an inlet diverting box or nozzle 52, arranged within and at the periphery of the chamber 44. This diverting box or nozzle extends circumferentially of the periphery of the chamber 24 and will cause the influent to travel circumferentially of the chamber 24. The numeral 53 designates a receiving box, having its top open, and connected with the upper end of a vertical down-pipe 54 which extends downwardly into the chamber 27, as shown. The receiver box 53 is arranged near the upper end of the chamber 24 and determines the level of the emulsion therein. It is pointed out that the oil inlet for the receiving chamber 24 is submerged at all times, facilitating preliminary stratification of free salt water and the lighter constituents of the emulsion, causing the heavier mist in the whirling stream within the receiving chamber 24 to become entrained in the emulsion before entering the receiving box 53, while the free gas liberated from the emulsion rises into the separating chamber or turret for extraction of the heavier fractions, thereby eliminating loss of volume or reduction in gravity of the treated product. The settling chamber 25 has an outlet pipe 55, leading into the upper portion thereof, for determining the level of the pure oil therein. This outlet pipe is connected with a pipe 56. A gas return pipe 57 is connected with the pipe 56 and leads back into the top of the settling chamber 25, as shown.

The scrubbing or treating chamber 26 may be regarded as extending from the bottom 49 to horizontal segmental partitions 58, each of which extends for 90°. These segmental partitions are spaced for 90°, affording open vertical channels or passages 59 between them. The sides of these channels 59 are covered by depending aprons 60, curved in horizontal cross-section, and arranged at the inner edges of the segmental partitions 58 extending for 90°. The segmental partitions 58 and aprons 60 are identical with the segmental partitions and aprons disclosed in my said co-pending application.

Arranged within the chamber 26 are spaced baffle trays 61, 62, 63, 64, 65, 66 and 67. These baffle trays are identical in construction and arrangement with the baffle trays shown in my said co-pending application, and the uppermost baffle tray 67 has a set of apertures 68 in its top, as shown.

The down-pipe 54 extends into the chamber 27, as stated, and is therein connected with a spreader including a horizontal pipe 69, carrying spaced horizontal branch pipes 70. These branch pipes are apertured or have nozzles upon their top sides, for spraying the emulsion upwardly.

This spreader is identical with the spreader shown in my said co-pending application.

The numeral 71 designates a heating element, identical with the heating element shown in my said co-pending application. This heating element projects into the chamber 27 above the pipes 69 and 70. The heating element includes a central tube and an annular group of tubes, for the passage of the products of combustion. The liquid within the chamber 27 is heated by the heating element and passes upwardly within the chamber 27 about and in contact with the heating element.

A differential pressure control device is provided for the outlet pipe 56 and includes a differential pressure operated valve 72 connected in the pipe 56. When the valve 72 opens, the oil is withdrawn. This valve includes a valve element connected with a diaphragm. This differential pressure valve is identical with the differential pressure valve controlling the outlet of the oil in my said co-pending application.

The numeral 73 designates a drain pipe having a branch 74 connected with the head 22 and leading into the bottom of the chamber 27. The pipe 73 is equipped with a valve 75. Connected with the drain pipe 73 is a branch pipe 76, equipped with a cut-off valve 77. This branch pipe 76 is connected with the bottom 46 of the chamber 24. By opening the valve 75, the chambers 26 and 27 may be drained, and by opening the valve 77, the chamber 24 may be drained. When the valve 77 is opened, the bottom of the chamber 24 is placed in communication with the automatic siphon draw-off pipe 73, so that the water in the bottom of the chamber 24 may be manually drained as required.

Means are provided for maintaining a selected level of the salt water within the chambers 26 and 27, including the conventional siphon arrangement for water disposal. This means includes a vertical pipe 78 extending into the casing 20 and having its intake end terminating near the bottom of the chamber 27. The upper end of this pipe is connected with a siphon box 79, Figure 2, connected at its top with a pressure equalizer pipe 80, leading into the chamber 25. Extending into the box 79 is a vertically adjustable tubular nipple 81 connected with a vertical pipe 82. By vertically adjusting the nipple 81, the liquid in the chambers 26 and 27 may be maintained at a selected level. This siphon is similar to that shown and described in my said co-pending application. The pipe 82 has a differential pressure valve 83 connected therein and this differential pressure valve is identical with the corresponding differential pressure valve shown in my co-pending application. The pipe 82 is connected with the salt water disposal pipe 73. A pipe 84 is connected with the chamber or turret 23, and has a pressure relief valve 85 connected therein. This is a safety valve and opens only at a pressure above the selected operating pressure to be carried in the apparatus. A pipe 86 is connected with the pipe 84 and has a back pressure regulator valve 87 connected therein. This regulator valve has a diaphragm which opens and closes the valve element in response to small variations in inlet pressure, thereby automatically maintaining the selected operating pressure to be carried. The valve 87 is identical with the corresponding valve used in my said co-pending application. A pipe 88 is connected in the pipe 86 and is connected with a branch pipe 89, which is connected with the diaphragm housing of the valves 72 and 83 above the diaphragms therein. The pipe 88 and branch pipe 89 are small gas equalizing lines to convey the pressure maintained in the system including gas disposal pipe 86, to the top of diaphragms in differential control valves, on both the water disposal and oil discharge lines. The action of these two differential control valves is responsive to the hydrostatic head of the liquid in the salt water disposal line 82 and in the oil discharge pipe 56, which acts upon the diaphragms of the valve 83 and 72, unseating the valve elements in opposition to the action of the valve counter-balance weights. Since the weight of the valve elements including diaphragm, plate, stem and the force created by the constant gas pressure on top of the diaphragm, is just counter-balanced by means of the weight and lever, the valve opens and closes responsive to the column of fluid in the draw-off lines independently of any change of pressure in the system or head of fluid existing in the treater proper.

The operation of the apparatus is as follows:

The crude oil having the free water previously removed therefrom or containing the emulsion and a relatively small amount of salt water and gas is fed continuously at the proper rate through the pipe 51 into the diverting box or nozzle 52, within the receiving chamber 24. The result of the circumvolution of the liquid in the chamber 24 tends to the separation of the relatively small amount of free gas associated with the emulsion. The chamber 24 is filled with the emulsion to the level of the receiver box 53, and the level is maintained at this elevation of the receiver box, and the emulsion flows into the top of the receiver box 53 and then into the down-pipe 54. The small amount of free water associated with the emulsion settles in the bottom of the receiver chamber 24. The free gas released within the receiver chamber 24 passes upwardly through the central tube 30. This gas passes radially through the openings 36 and discharges within the wings or vanes 37 within the chamber 35 and mingles with the gas discharging from the upper ends of the pipes 47 from the top of the settling chamber 25. These gases contact with and rub against wings 37 and adjacent walls and travel circumferentially within these wings and then discharge into the space inwardly of the channels 39 and contact with and rub against these channels. The gases then pass between the channels and enter the passage 41 and pass upwardly into the chamber 44' beneath the apertured plate 44 and contact with and rub against the lower surface of this apertured plate. The apertures of this plate are punched and swaged downwardly, as stated. The gases then discharge through the apertures 45 into the upper portion of the chamber or turret 23. This contacting and rubbing action separates the oil mixed in the gas stream. The dry gas passes out through the outlet pipe 86. The heavier hydrocarbons or oil mixtures are now converted into liquid form and this liquid oil within the chamber 44' beneath the apertured plate 44 is partly caught upon the upper surface of the plate 31 and partly descends through the passage 41. This oil is conducted through the pipe 30 and passage 41 to the sump chamber 34, and is conducted by the down-pipes 48 into the bottom of the settling chamber 25. The lower ends of these pipes 48 form a liquid seal with the treated oil within the settling chamber.

Due to the low temperature in the chamber 44' and above it, there is a tendency to condense the heavy hydrocarbon fractions, as isopentanes, pentanes and other heavier fractions, which otherwise would not be recovered by the mechanical action of the gas separator.

The emulsion entering the receiver box 53 now passes through the down-pipe 54. The emulsion flows by gravity through the pipe 54 and is discharged from the lower end of the down-pipe into the spreader, which is located beneath the heating element 71. The warm gases released from the oil in the settling chamber 25 pass up through the pipes 47 into the chamber 35, as stated.

The spreader now receives the descending emulsion and serves to discharge or diffuse the emulsion over practically the entire cross sectional area of the baffle trays. This emulsion is sprayed from the spreader in an upward direction and the warm emulsion rises and flows upwardly around the heating element and is heated thereby. The flow of the emulsion through the apertures or nozzles of the pipes 70 is maintained constant by the static head created by the vertical distance between the receiver box 53 and the spreader. The emulsion therefore discharges from the spreader upwardly in a continuous manner and passes around and in contact with the heating element. The heated emulsion passes upwardly above the heating element and is restricted in its upward passage upon entering the scrubbing and treating chamber 26 where it engages with scrubbing trays.

The upwardly traveling emulsion enters the bottom baffle tray 61 and then passes from this baffle tray to and through each succeeding upper baffle tray. In passing through each baffle tray, the velocity of the emulsion is reduced. The emulsion is caused to travel horizontally in a tortious passage about the baffles in each baffle tray, and travels in opposite directions in each succeeding baffle tray, as fully disclosed in my said co-pending application. By this arrangement, the horizontal and vertical travel of the emulsion is prolonged and this produces an optimum of scrubbing and washing effect. The fluid, owing to its slow passage through the arrangement of baffle trays, rises by thermoaction and the oil is released by gravitational separation, the result of heating and scrubbing contact that the emulsion had with the baffles and baffle trays. The mixture, in its circuitous upward travel, contacts with the lower faces of the baffle trays, marginal flanges and baffles, and the droplets of oil are slowly pushed along in the fluid stream, while impinging against the surfaces. This scrubbing action under the application of heat lowers the interfacial tension between the oil and brine surfaces, thereby separating the oil from the salt water and from any free salt or solids in suspension. In passing under the trays, the oil in the fluid stream being at the top, and the salt water and heavier constituents, at the bottom, these heavier constituents are drawn off under each baffle tray, such heavier constituents moving outwardly and downwardly between the marginal flange of each baffle tray and reflux from beneath the marginal flange. The salt water and heavier constituents, upon passing outwardly beyond the marginal flanges of the baffle trays, enter the vertical passage which surrounds these trays and travels downwardly and in this passage, by gravity, will impinge upon the segmental partitions 58, and are deflected thereby into the open vertical passages 59. In passing downwardly through the passages 59, the aprons 60 tend to separate the downwardly moving salt water and the heavy constituents from the upwardly moving emulsion discharging from the spreader. The several baffle trays forming the baffle unit are so spaced that they provide side opening areas for effecting a refluxing of the salt water and heavy constituents without the use of a central pipe. The relationship of the baffle unit and the heating element is of prime consideration, in that these two elements, in conjunction with the arrangement of the passages formed by the segmental partitions 58 and aprons 60, provide a means that results in an extremely efficient circulating system. The level of the water in the chamber 27 is maintained constant by the adjustable siphon.

The oil released from the mixture as it rises through the trays, spreads out in a thin film under the tray-heads, while the salt water and heavier constituents descend as reflux. The scrubbing and washing action frees the oil of impurities and solids, such as salt particles held in suspension, and the clean oil, after passing through the perforations 50, travels through the body of oil collected in the settling chamber 25. As the gas liberated from the oil on its passage in and from the baffle unit and through the settling chamber tends to turbulence, for this reason the apertures 50 are arranged with respect to apertures 68, to direct the oil cross-wise from the apertures 68 to the apertures 50, which causes further retardation of the flow of the oil in the settling chamber and prevention of intense ebullition of the gas. As the level of oil rises in the settling chamber, the treated oil passes through pipe 55. Any warm vapors released in the settling chamber 25 pass upwardly through the pipes 47, as explained.

Under operation, a constant pressure is carried throughout the system while automatic discharge of both the oil and salt water is governed by the differential control valves 72 and 83. The gas pressure is maintained constant and equal upon the upper side of the diaphragms of these differential control valves. The hydrostatic head of the liquid in the salt water outlet pipe 82 and in the oil outlet pipe 56 acts upon the lower faces of the diaphragms and unseats the valve elements in opposition to the action of the weights, and since the weight of the valve element includes diaphragm, plate, and stem and the force created by the constant gas pressure on the top of the diaphragm are just counterbalanced by means of the weight and lever, the valve opens and closes responsive of the column of fluid in the draw-off lines, independently of any change of pressure in the system or the head of fluid existing in the treater proper. It is preferred to operate the apparatus under a pressure of from ten to fifteen pounds per square inch, in which case the differential controls are necessary.

In case it is desired to handle emulsions at or near atmospheric pressure, in order to take off the gas in receiving chamber 24, rather than to handle volatile gases in connection with gaseous fluids released when heating under pressure, then the regulating differential pressure valves 72 and 83 and the back pressure regulator valve 87 are not required. The relief valve 85 may also be dispensed with, although it may be advisable to employ a relief valve with an outlet range in ounces of pressure, to meet various conditions of service, as an excessive flow rate.

It is preferred to maintain the temperature within the chambers 36 and 27 to a degree sufficient to break the emulsion but within limits, not enough to cause excessive vaporization of the oil. The average temperature is about 140° F., although this may be varied as found advantageous.. A self-acting temperature controller for automatically regulating the gas burner to maintain a constant predetermined temperature is employed for efficient operation. A thermometer, indicating pressure gauge, and liquid level gauge graph are also generally used.

It is to be understood that the forms of my invention herewith shown and described are to be taken as preferred examples of the same, and that various changes in the shape, size and arrangement of parts may be resorted to without departing from the spirit of my invention or the scope of the subjoined claims.

Having thus described my invention, what I claim is:

1. Apparatus for treating crude oil vapors, comprising an upstanding separating chamber, an upstanding central tube extending through the bottom of the separating chamber and spaced from the side of the separating chamber, the central tube having spaced openings in its side, an imperforate plate provided at the top of the central tube and the openings of the central tube and extending radially beyond the central tube for a substantial distance and spaced from the side of the separating chamber, a second plate surrounding the central tube beneath the openings and forming a space with the upper imperforate plate and spaced from the bottom of the separating chamber for forming a sump chamber, the lower plate being spaced from the side of the separating chamber, vanes disposed within the space between the upper and lower plates and including inner generally radial portions disposed adjacent to and upon corresponding sides of the openings of the central tube and outer circumferential portions which extend in the same direction and cover the openings of the central tube for imparting a generally horizontal circumferential movement to the vapors discharging through such openings, a plurality of outer tubes having substantially vertical discharge ends for discharging the vapors upwardly and substantially vertically through the lower plate and within the space and vanes at substantially right angles to the horizontal discharge of the vapors through the openings of the central tube, means to supply vapor to the central tube, means to supply the vapor to the outer tubes, and means providing gas and oil outlets from the apparatus.

2. Apparatus for treating crude oil vapors, comprising an upstanding separating chamber, a relatively large upstanding central tube within the separating chamber and having spaced openings in its side, an imperforate conical downwardly tapering plate covering the upper end of the central tube and disposed above the openings in the central tube and extending radially beyond the central tube for a substantial distance and spaced from the side of the separating chamber, a second plate surrounding the central tube beneath the openings and forming a generally horizontal space with the upper imporforate plate and spaced from the bottom of the separating chamber for forming a sump chamber, the lower plate being spaced from the side of the separating chamber and having openings provided near and corresponding in number to the openings of the central tube, vanes disposed within the space between the upper and lower plates and including generally radial inner portions disposed adjacent to and upon corresponding sides of the openings of the central tube and the openings of the lower plate and outer circumferential portions which extend in the same direction and cover the openings of the central tube for imparting a generally horizontal circumferential movement to the vapors discharging through such openings, a plurality of outer tubes having substantially vertical discharge ends for discharging the vapors upwardly and substantially vertically through the openings in the lower plate and within the space and vanes at substantially right angles to the horizontal discharge of the vapors through the openings of the central tube, means to supply vapors to the central tube, means to supply vapors to the outer tubes, a tube connected with the lower end of the conical plate and passing through the central tube and discharging into the sump chamber, and means providing gas and oil outlets from the apparatus.

3. Apparatus for treating crude oil vapors, comprising an upstanding separating chamber, an upstanding central tube within the separating chamber and having spaced openings in its side, an imperforate upper plate provided at the top of the central tube and the openings of the central tube and extending radially beyond the central tube for a substantial distance and spaced from the side of the separating chamber, a second plate surrounding the central tube beneath the openings and forming a generally horizontal space with the upper plate and spaced from the bottom of the separating chamber for forming a sump chamber, the lower plate being spaced from the side of the separating chamber and having openings provided near and corresponding in number to the openings of the central tube, separate circumferentially spaced vanes disposed within the space between the upper and lower plates, each vane including an inner generally radial portion disposed adjacent to and upon one side of the opening of the central tube and the opening of the lower plate and an outer circumferentially extending portion which covers the opening in the central tube, the circumferentially extending portions being spaced from each other and extending in the same direction, a plurality of outer tubes having vertical discharge ends discharging upwardly through the openings in the lower plate, the arrangement being such that the vapors from the outer tubes pass into the vanes at right angles to the vapors from the openings of the central tube, means to supply vapors to the central tube, and means to supply vapors to the outer tubes, and means providing gas and oil outlets from the apparatus.

ARTHUR V. B. CANDLER.

REFERENCES CITED

The following references are of record in the file of this patent:

UNITED STATES PATENTS

| Number | Name | Date |
|---|---|---|
| 668,866 | Young | Feb. 26, 1901 |
| 970,477 | Drum | Sept. 20, 1910 |
| 1,770,773 | Hackett | July 15, 1930 |
| 1,970,783 | Walker | Aug. 21, 1934 |
| 2,016,642 | Lincoln | Oct. 8, 1935 |
| 2,167,160 | Raymond | July 25, 1939 |
| 2,197,189 | Morgan | Apr. 16, 1940 |
| 2,232,948 | Ihrig et al., | Feb. 25, 1941 |
| 2,256,524 | McKelvey | Sept. 23, 1941 |
| 2,384,222 | Walker | Sept. 4, 1945 |